(12) United States Patent
Shibata

(10) Patent No.: US 12,608,605 B2
(45) Date of Patent: Apr. 21, 2026

(54) GROUPED CONVOLUTION PROCESSING DEFINITION CHANGING DEVICE, GROUPED CONVOLUTION PROCESSING DEFINITION CHANGING METHOD, AND GROUPED CONVOLUTION PROCESSING DEFINITION CHANGING PROGRAM

(71) Applicant: NEC Corporation, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 741 days.

(21) Appl. No.: 17/918,945

(22) PCT Filed: Apr. 28, 2020

(86) PCT No.: PCT/JP2020/018168
§ 371 (c)(1),
(2) Date: Oct. 14, 2022

(87) PCT Pub. No.: WO2021/220422
PCT Pub. Date: Nov. 4, 2021

(65) Prior Publication Data
US 2023/0237322 A1 Jul. 27, 2023

(51) Int. Cl.
*G06N 3/08* (2023.01)
*G06N 3/0464* (2023.01)
*G06N 3/063* (2023.01)

(52) U.S. Cl.
CPC ............. *G06N 3/08* (2013.01); *G06N 3/0464* (2023.01); *G06N 3/063* (2013.01)

(58) Field of Classification Search
CPC ......... G06N 3/08; G06N 3/0464; G06N 3/063
See application file for complete search history.

(56) References Cited

U.S. PATENT DOCUMENTS

| | | | |
|---|---|---|---|
| 11,841,792 B1 * | 12/2023 | Diamant | G06F 9/3016 |
| 2018/0018556 A1 * | 1/2018 | Young | G06N 3/045 |
| 2022/0215237 A1 * | 7/2022 | Takenaka | G06N 3/0464 |

FOREIGN PATENT DOCUMENTS

| | | | | |
|---|---|---|---|---|
| CN | 113255730 A | * | 8/2021 | G06N 3/045 |
| WO | 2020/044527 A1 | | 3/2020 | |

OTHER PUBLICATIONS

Alex Krizhevsky et al. ,"ImageNet Classification with Deep Convolutional Neural Networks," NIPS 2012, available at <URL=https://papers.nips.cc/paper_files/paper/2012/hash/c399862d3b9d6b76c8436e924a68c45b-Abstract.html> (Year: 2012).*

(Continued)

*Primary Examiner* — James T Tsai

(74) *Attorney, Agent, or Firm* — Sughrue Mion, PLLC

(57) ABSTRACT

A generation unit generates a new j-th weight matrix to be used in the convolution computation of data consisting of $\{(j-1)\times N/g+1\}$ to $(j\times N/g)$ channels (j=1 to g) divided after the divided number is changed over j=1 to j=g respectively. The generation unit generates the new j-th weight matrix by placing $\{(j-1)\times G/g+1\}$ to $(j\times G/g)$ weight matrices from the upper left to the lower right of the new j-th weight matrix in the order of $\{(j-1)>G/g+1\}$ to $(j\times G/g)$ weight matrices on the diagonal line, and setting values of all components except for components at locations where the weight matrices are placed to 0.

9 Claims, 8 Drawing Sheets

(56) References Cited

OTHER PUBLICATIONS

Lee, Tae Kwan, et al. "Convolution with logarithmic filter groups for efficient shallow CNN." International Conference on Multimedia Modeling. Cham: Springer International Publishing, 2018. (Year: 2018).*

Yi, S., Ju, J., Yoon, M. K., & Choi, J. (2017). Grouped convolutional neural networks for multivariate time series. arXiv preprint arXiv:1703.09938. (Year: 2017).*

Zhang, Z., Li, J., Shao, W., Peng, Z., Zhang, R., Wang, X., & Luo, P. (2019). Differentiable learning-to-group channels via groupable convolutional neural networks. In Proceedings of the IEEE/CVF international conference on computer vision (pp. 3542-3551). (Year: 2019).*

JP Office Action for JP Application No. 2022-518508, mailed on Dec. 5, 2023 with English Translation.

Akira Kawada et al., "Measurement of UVA Protection Factors of Sunscreens with SPEX SkinSkan," Skin Research, 2004, vol. 3, No. 3, pp. 261-265.

International Search Report for PCT Application No. PCT/JP2020/018168, mailed on Aug. 11, 2020.

S. Xie, R. Girshick, P. Dollar, Z. Tu, and K. He, "Aggregated Residual Transformations for Deep Neural Networks," in Computer Vision and Pattern Recognition, 2017.

Kazuya Machida, "Embedded GPU/CPU implementation for deep learning applications", MATLAB EXPO 2019 [online], The Mathworks, Inc., May 28, 2019, pp. 1-39, <URL:https://www.matlabexpo.com/content/dam/mathworks/mathworks-dot-com/images/events/matlabexpo/jp/2019/b4-deeplearning-embedded-c-mw.pdf>.

* cited by examiner

100

GROUPED CONVOLUTION PROCESSING
DEFINITION CHANGING DEVICE

11

CPU

12

MAIN STORAGE
UNIT

15

INPUT UNIT

17

OUTPUT UNIT

16

COMMUNICATION
UNIT

13

AUXILIARY STORAGE
UNIT

14

20

GROUPED CONVOLUTION PROCESSING
DEFINITION CHANGING DEVICE

CHANGING MEANS          21

22          GENERATION MEANS

GROUPED CONVOLUTION PROCESSING DEFINITION CHANGING DEVICE, GROUPED CONVOLUTION PROCESSING DEFINITION CHANGING METHOD, AND GROUPED CONVOLUTION PROCESSING DEFINITION CHANGING PROGRAM

This application is a National Stage Entry of PCT/JP2020/018168 filed on Apr. 28, 2020, the contents of all of which are incorporated herein by reference, in their entirety.

TECHNICAL FIELD

The present invention relates to a grouped convolution processing definition changing device, a grouped convolution processing definition changing method, and a grouped convolution processing definition changing program.

BACKGROUND ART

A convolutional neural network (CNN) is a feed-forward neural network with a structure consisting of two alternating layers: a convolutional layer and a pooling layer. Hereafter, convolutional neural networks are also referred to simply as CNNs.

FIG. 8 is an explanatory diagram showing an example of a convolutional neural network. In the CNN shown in FIG. 8, the first convolutional layer, the first pooling layer, the second convolutional layer, and the second pooling layer are stacked alternately.

$C_1$ and $C_2$ shown in FIG. 8 represent convolution computations, respectively. For example, the convolution computation $C_1$ is executed on the input image that is input to the first convolution layer.

Note that an image is an example of input data; data input to the CNN may be data other than images.

$P_1$ and $P_2$ shown in FIG. 8 represent pooling computations, respectively. For example, the pooling computation $P_1$ is executed on the result of the convolution computation that is input to the first pooling layer.

F shown in FIG. 8 represents the all-joining network. The all-joining network F has the function of an all-joining layer that joins all the nodes of the second pooling layer with those of the output layer. Finally, the output of the CNN is obtained from the output layer.

The following is a specific explanation of convolution computation in a CNN. FIG. 9 is an explanatory diagram showing an example of convolution computation in a CNN. The example of convolution computation shown in FIG. 9 corresponds to the convolution computation $C_1$ shown in FIG. 8.

The input image shown in FIG. 9 is the image that is input to the CNN. The input image shown in FIG. 9 consists of the first to $C_{in}$ channels ($C_{in}$ is an integer greater than or equal to 2) in sequence. In other words, $C_{in}$ means the number of input channels. As shown in FIG. 9, the vertical size of the image comprising the input image is H and the horizontal size is W.

For simplicity of explanation, consider as input X, the object of the convolution computation, an image with a vertical size of 1, horizontal size of 1, and number of channels $C_{in}$ marked with the grid pattern shown in FIG. 9. The bottom row of FIG. 9 shows the input X as viewed from the height direction. The sign to the left of the input X shown in FIG. 9 is the identification number of the channel (the same in the other figures).

In other words, in the example of the convolution computation shown in FIG. 9, the kernel size is "1×1". However, the contents of the following explanation are the same even if the kernel size is other than "1×1" (e.g., "3×3" or "5×5").

In the convolution computation shown in FIG. 9, the weight W, whose vertical size is $C_{out}$ and horizontal size is $C_{in}$, are multiplied with the input X. The result of the multiplication is the output $Y_0$, which is an image with $C_{out}$ number of channels. In other words, $C_{out}$ means the number of output channels.

The convolution computation shown in FIG. 9 corresponds to the multiplication of matrices. That is, in the convolution computation shown in FIG. 9, the weight W, input X, and output $Y_0$ are each treated as a matrix. The "weight" in this description is precisely "weight matrix," but for the sake of simplicity, they are also referred to simply as "weight".

The CNNs shown in FIGS. 8 to 9 are learned models. In other words, the weight W shown in FIG. 9 are also weight obtained by the learning being executed in advance.

The CNNs that use grouped convolution as a method of the above convolution computation are increasing. For example, a description of grouped convolution is provided in Non Patent Literature (NPL) 1.

CITATION LIST

Non Patent Literature

NPL 1: S. Xie, R. Girshick, P. Dollar, Z. Tu, and K. He, "Aggregated Residual Transformations for Deep Neural Networks," in Computer Vision and Pattern Recognition, 2017.

SUMMARY OF INVENTION

Technical Problem

The computation of grouped convolution has advantages over the computation of ordinary convolution, such as smaller arithmetic operations and higher accuracy. However, when AI (Artificial Intelligence) chips, which are semiconductor integrated circuits specialized for AI processing, execute the computation of grouped convolution, the computation speed may decrease.

Since the use of both grouped convolution and AI chips is expected to increase, there is a need for a method that does not slow down the computation speed of grouped convolution even when AI chips execute the computation of grouped convolution. NPL 1 does not describe a method that does not slow down the computation speed of grouped convolution.

Therefore, it is an object of the present invention to provide a grouped convolution processing definition changing device, a grouped convolution processing definition changing method, and a grouped convolution processing definition changing program that can increase the computation speed of grouped convolution.

Solution to Problem

A grouped convolution processing definition changing device according to the present invention includes a changing means which changes, for a learned convolutional neural network in which grouped convolution is defined in which input data consisting of first to N-th channels (N is an integer greater than or equal to 2) arranged in order is divided into G (G is an integer greater than or equal to 2) pieces in a channel direction, and convolution computations are executed for data consisting of $\{(i-1) \times N/G+1\}$ to $(i \times N/G)$ channels ($i=1$ to $G$) divided using i-th weight matrix over $i=1$ to $i=G$ respectively, a number which the input data is divided from G to g (where g is a divisor of G excluding G), and a generation means which generates a new j-th weight matrix to be used in the convolution computation of data consisting of $\{(j-1) \times N/g+1\}$ to $(j \times N/g)$ channels ($j=1$ to g) divided after the divided number is changed over $j=1$ to $j=g$ respectively, wherein the generation means generates the new j-th weight matrix by placing $\{(j-1) \times G/g+1\}$ to $(j \times G/g)$ weight matrices from the upper left to the lower right of the new j-th weight matrix in the order of $\{(j-1) \times G/g+1\}$ to $(j \times G/g)$ weight matrices on the diagonal line, and setting values of all components except for components at locations where the weight matrices are placed to 0.

A grouped convolution processing definition changing method according to the present invention includes changing, for a learned convolutional neural network in which grouped convolution is defined in which input data consisting of first to N-th channels (N is an integer greater than or equal to 2) arranged in order is divided into G (G is an integer greater than or equal to 2) pieces in a channel direction, and convolution computations are executed for data consisting of $\{(i-1) \times N/G+1\}$ to $(i \times N/G)$ channels ($i=1$ to G) divided using i-th weight matrix over $i=1$ to $i=G$ respectively, a number which the input data is divided from G to g (where g is a divisor of G excluding G), generating a new j-th weight matrix to be used in the convolution computation of data consisting of $\{(j-1) \times N/g+1\}$ to $(j \times N/g)$ channels ($j=1$ to g) divided after the divided number is changed over $j=1$ to $j=g$ respectively, and generating the new j-th weight matrix by placing $\{(j-1) \times G/g+1\}$ to $(j \times G/g)$ weight matrices from the upper left to the lower right of the new j-th weight matrix in the order of $\{(j-1) \times G/g+1\}$ to $(j \times G/g)$ weight matrices on the diagonal line, and setting values of all components except for components at locations where the weight matrices are placed to 0.

A grouped convolution processing definition changing program according to the present invention, causing a computer to execute a changing process of changing, for a learned convolutional neural network in which grouped convolution is defined in which input data consisting of first to N-th channels (N is an integer greater than or equal to 2) arranged in order is divided into G (G is an integer greater than or equal to 2) pieces in a channel direction, and convolution computations are executed for data consisting of $\{(i-1) \times N/G+1\}$ to $(i \times N/G)$ channels ($i=1$ to G) divided using i-th weight matrix over $i=1$ to $i=G$ respectively, a number which the input data is divided from G to g (where g is a divisor of G excluding G), and a generation process of generating a new j-th weight matrix to be used in the convolution computation of data consisting of $\{(j-1) \times N/g+ 1\}$ to $(j \times N/g)$ channels ($=1$ to g) divided after the divided number is changed over $j=1$ to $j=g$ respectively, wherein the grouped convolution processing definition changing program causes the computer to generate the new j-th weight matrix by placing $\{(j-1) \times G/g+1\}$ to $(j \times G/g)$ weight matrices from the upper left to the lower right of the new j-th weight matrix in the order of $\{(j-1) \times G/g+1\}$ to $(j \times G/g)$ weight matrices on the diagonal line, and setting values of all components except for components at locations where the weight matrices are placed to 0, in the generation process.

Advantageous Effects of Invention

According to this invention, it is possible to increase the computation speed of grouped convolution.

DESCRIPTION OF EMBODIMENTS

Figure 1:
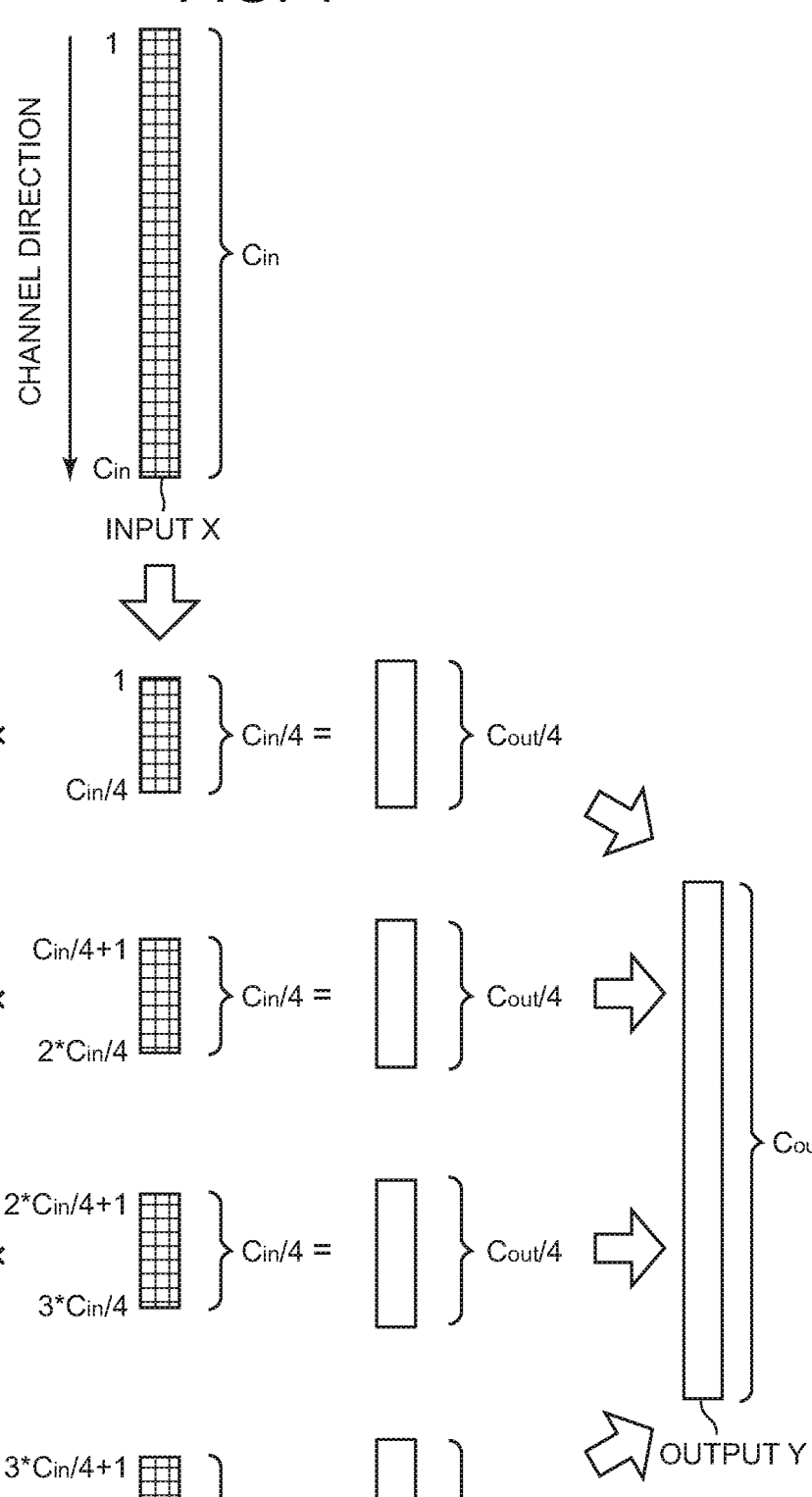
FIG. 1 is an explanatory diagram showing an example of the computation of grouped convolution in the CNN.

First, the computation of grouped convolution in the CNN is explained in detail. FIG. 1 is an explanatory diagram showing an example of the computation of grouped convolution in the CNN.

Figure 9:
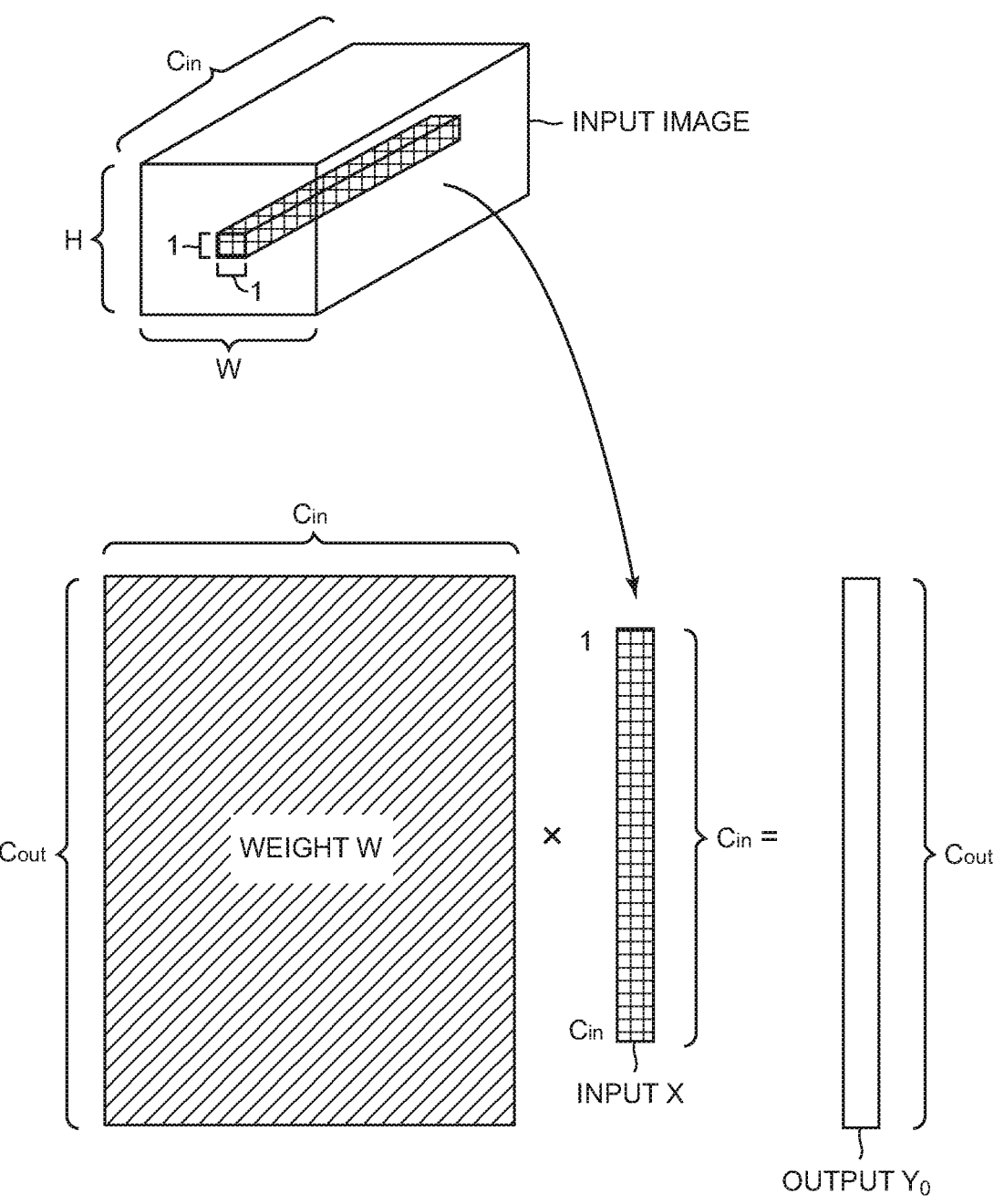
FIG. 9 is an explanatory diagram showing an example of convolution computation in a CNN.

The example of the computation of grouped convolution shown in FIG. 1 is an example of the case where the grouped convolution is applied to the convolution computation shown in FIG. 9. In this example, we also consider the case where the AI chip executes the computation of grouped convolution.

In the example of the computation of grouped convolution shown in FIG. 1, the number of groups is defined as "4". In other words, the CNN used in the example shown in FIG. 1 is a pre-learned model on which it is predefined that the input X is divided into four groups in the channel direction and the convolution computation is executed.

Note that input X, which is an image, is an example of input data; data input to the CNN may be data other than images.

Thus, as shown in FIG. 1, in the computation of grouped convolution, weights $W_a$ to $W_d$ with a vertical size of $(C_{out}/4)$ and a horizontal size of $(C_{in}/4)$ are provided. The AI chip, for example, multiplies the weight $W_a$ with the image (with the number of channels $(C_{in}/4)$) consisting of the first to the $C_{in}/4$ channels divided. As a result of the multiplication, the AI chip obtains an image with the number of channels $(C_{out}/4)$ as its output.

As shown in FIG. 1, the AI chip also executes the above computation for weights $W_b$ to $W_a$, respectively. In other words, the AI chip divides the input X into 4 pieces in the channel direction, and executes the convolution computation for the image consisting of the $\{(i-1)\times C_{in}/4+1\}$ to the $(i\times C_{in}/4)$ channels ($i=1$ to 4) divided using the i-th weight matrix over $i=1$ to $i=4$, respectively. The first through fourth weight matrices correspond to the weights $W_a$ to $W_d$, respectively. As a result of each computation, the AI chip obtains four images with the number of channels $(C_{out}/4)$.

Finally, the AI chip places the obtained images in the same positions as the quad-divided input X used in the computation. After placing each of the four obtained images, the AI chip combines each image.

By combining, the AI chip obtains an output Y that is an image with the number of channels $C_{out}$, which is equivalent to the result of the computation of the normal convolution. Note that the output Y obtained by the computation of grouped convolution shown in FIG. 1 is not equivalent to the output $Y_0$ obtained by the convolution computation shown in FIG. 9.

The amount of the convolution computation is proportional to the size of the weights. For example, the amount of the convolution computation shown in FIG. 9 is proportional to $(C_{in}\times C_{out})$, the size of the weight W. Also, the amount of the computation of grouped convolution shown in FIG. 1 is proportional to $\{(C_{in}/4)\times(C_{out}/4)\times4\}$, which is the sum of the sizes of the weights $W_a$ to $W_d$. In other words, the amount of the computation of grouped convolution shown in FIG. 1 is ¼ of the amount of the convolution computation shown in FIG. 9.

In general, if the input X is divided into G (G is an integer greater than or equal to 2) groups and the computation of grouped convolution is executed, the amount of the computation of grouped convolution shown in FIG. 1 is proportional to $\{(C_{in}/G)\times(C_{out}/G)\times G\}$. In other words, the amount of the computation of grouped convolution shown in FIG. 1 is 1/G of the amount of the convolution computation shown in FIG. 9.

According to the above theory, the computational speed of grouped convolution is expected to be G times faster than that of normal convolution, since the amount of computation is 1/G. However, many AI chips are not suitable for grouped convolution because they are optimized for normal convolution.

For AI chips that are not suitable for grouped convolution, for example, the computational process of grouped convolution may be implemented as a computational process of multiple convolutions. Thus, an AI chip with a computational process of multiple convolutions implemented would be affected by the overhead of calling convolution computations G times when executing the computations of grouped convolution. If an AI chip is affected by the overhead G times, the computational speed of grouped convolution would decrease.

In addition, in the computation of grouped convolution, the number of channels of images to be computed at one time is small (e.g., $(C_{in}/4)$ shown in FIG. 1). Therefore, the number of channels of images, which is the number of computational processes of convolution that can be executed simultaneously, is likely not to reach the maximum number of processes that the AI chip can process in parallel.

For example, if an image with 8 channels is input to an AI chip that can process up to 256 processes in parallel, the AI chip can only process a maximum of 8 processes in parallel.

In other words, the smaller parallelism of processing is one of the factors that reduce the computational speed of grouped convolution.

[Description of Configuration]

Figure 2:
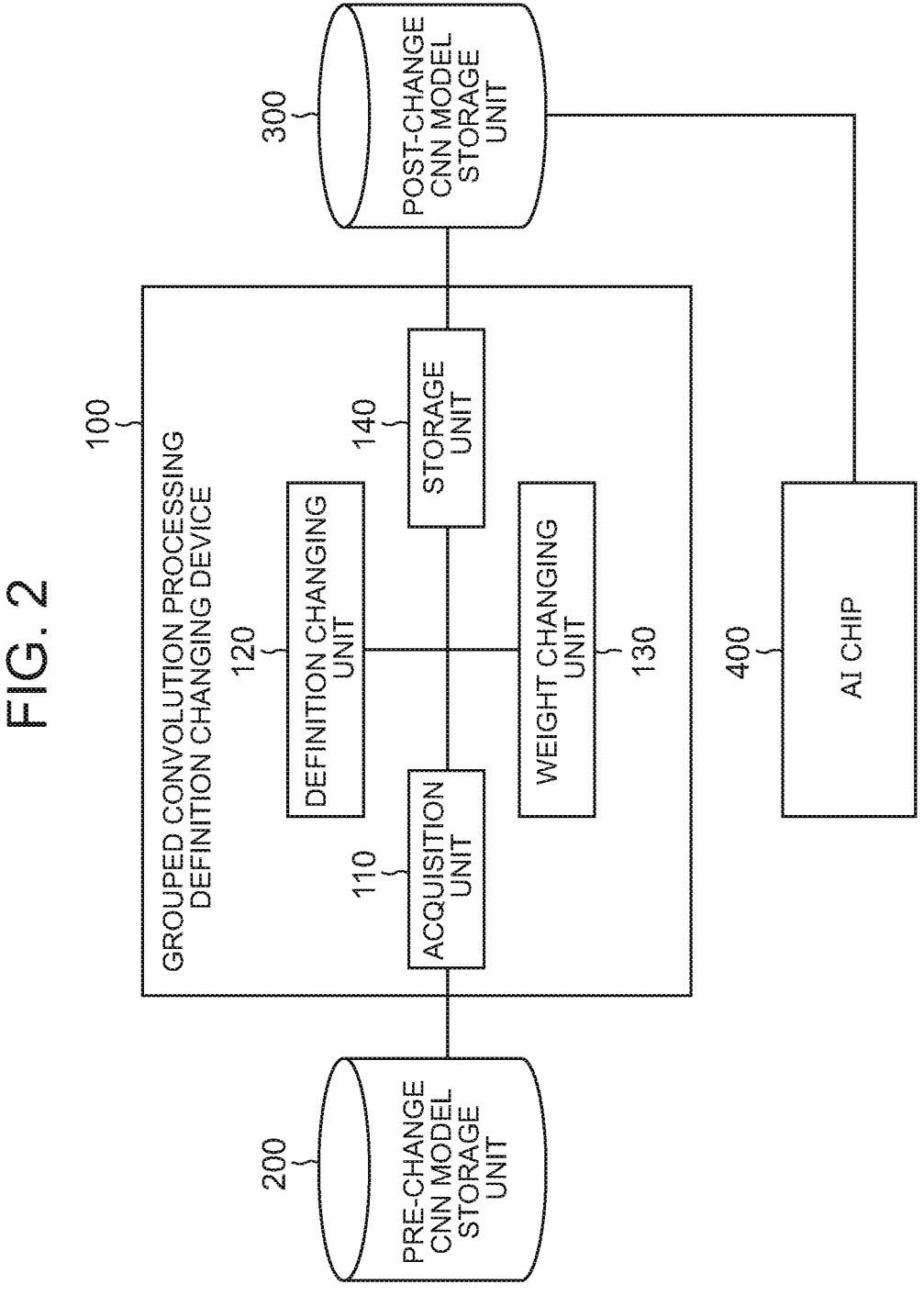
FIG. 2 is a block diagram showing an example of the configuration of a grouped convolution processing definition changing device of the example embodiment of the present invention.

The following describes with reference to the drawings an example embodiment of the present invention that can increase the computation speed of grouped convolution, the issue discussed above. FIG. 2 is a block diagram showing an example of the configuration of a grouped convolution processing definition changing device of the example embodiment of the present invention.

The grouped convolution processing definition changing device 100 shown in FIG. 2 is communicatively connected to the pre-change CNN model storage unit 200 and the post-change CNN model storage unit 300.

The pre-change CNN model storage unit 200 stores the learned CNN models described above, including the weights $W_a$ to $W_d$ shown in FIG. 1. The learned CNN models stored in the pre-change CNN model storage unit 200 are models that have been learned on which the grouped convolution has been defined.

The post-change CNN model storage unit 300 stores the learned CNN models stored in the pre-change CNN model storage unit 200 whose definitions have been changed by the grouped convolution processing definition changing device 100.

The AI chip 400 is communicatively connected to the post-change CNN model storage unit 300. The AI chip 400 is a chip that executes the convolution computation using the learned CNN model stored in the post-change CNN model storage unit 300.

As shown in FIG. 2, the grouped convolution processing definition changing device 100 includes an acquisition unit 110, a definition changing unit 120, a weight changing unit 130, and a storage unit 140.

The acquisition unit 110 acquires the learned CNN model from the pre-change CNN model storage unit 200, including the weights $W_a$ to $W_d$ shown in FIG. 1.

In order to solve the above-mentioned issues, the grouped convolution processing definition changing device 100 of this example embodiment is characterized by re-combining each group in the computation of grouped convolution. The following describes how the grouped convolution processing definition changing device 100 solves the issues.

Figure 3:
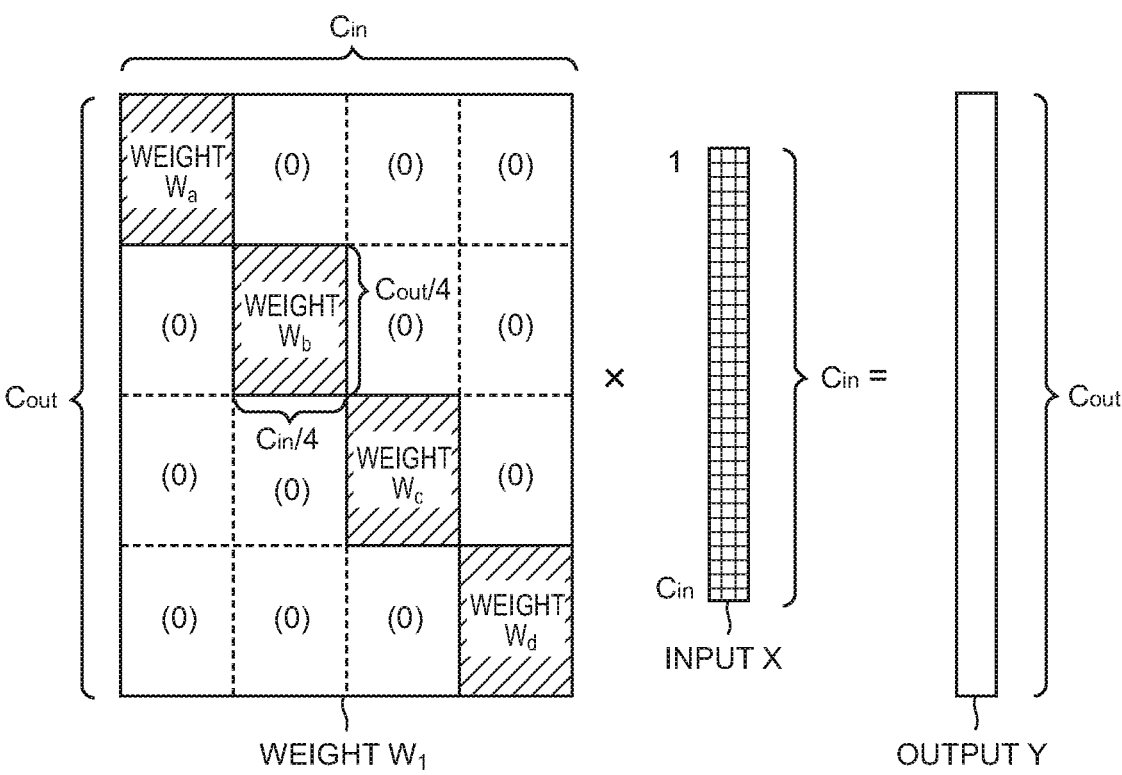
FIG. 3 is an explanatory diagram showing an example of the computation of grouped convolution whose definition has been changed by the grouped convolution processing definition changing device 100.

FIG. 3 is an explanatory diagram showing an example of the computation of grouped convolution whose definition has been changed by the grouped convolution processing definition changing device 100.

Figure 4:
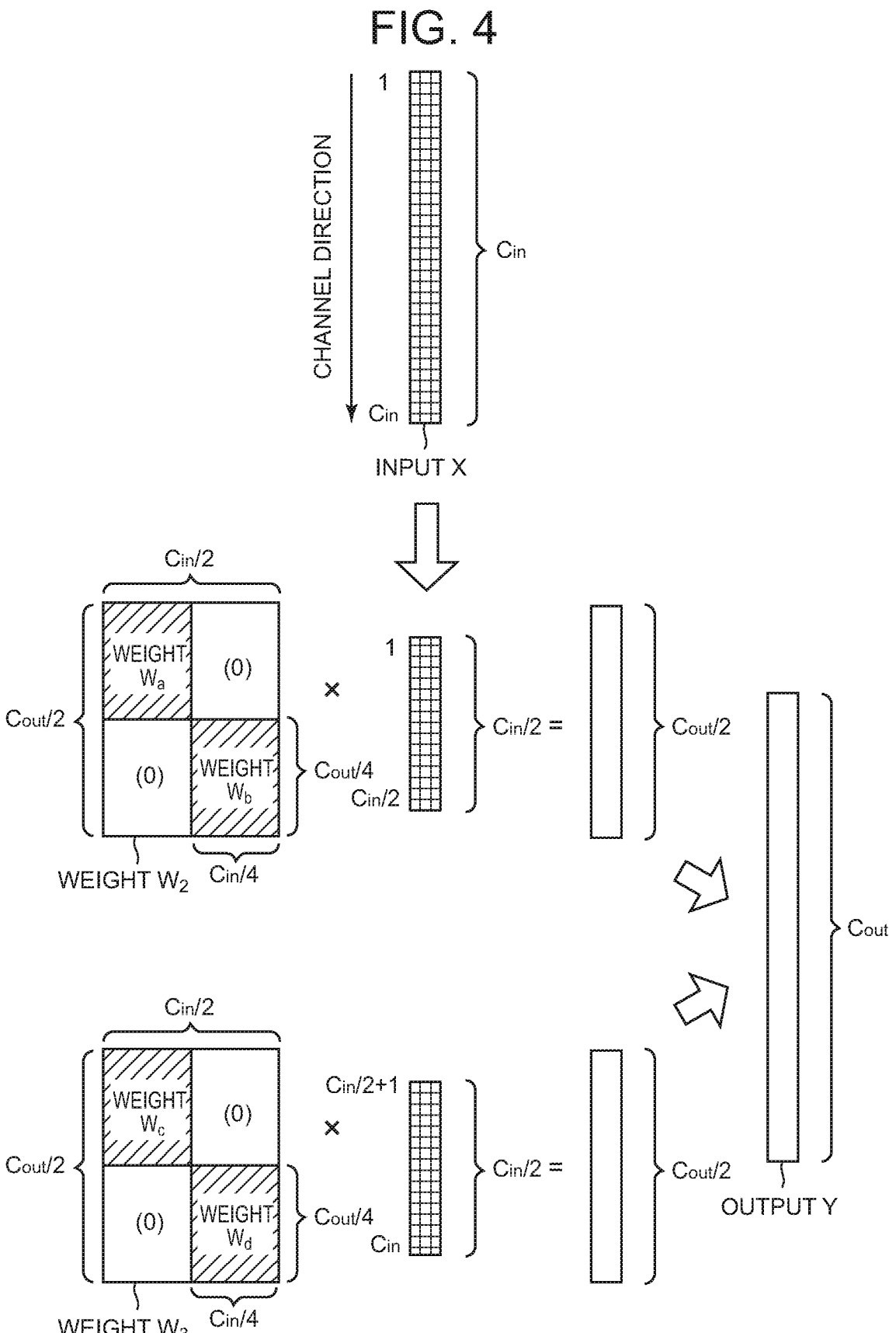
FIG. 4 is an explanatory diagram showing another example of the computation of grouped convolution whose definition has been changed by the grouped convolution processing definition changing device 100.

In the example of the convolution computation shown in FIGS. 3 to 4, the kernel size is "1×1". However, the contents of this example embodiment are the same even if the kernel size is other than "1×1" (e.g., "3×3" or "5×5").

In the convolution computation shown in FIG. 3, the definition changing unit 120 changes the number of groups defined in the learned CNN model stored in the pre-change CNN model storage unit 200 from "4" to "1". With the change in the number of groups, the weight changing unit 130 prepares only one weight $W_1$.

As shown in FIG. 3, the weight changing unit 130 places the weights $W_a$ to $W_d$ shown in FIG. 1 from the upper left to the lower right of the weight $W_1$, in the order of the weights $W_a$ to $W_d$ on the diagonal line. Next, the weight changing unit 130 generates the weight $W_1$ by setting the values of all components except for the components at the locations where the weights $W_a$ to $W_d$ are placed to 0.

As shown in FIG. 3, the weight $W_1$ is a weight that has a vertical size of $C_{out}$ and a horizontal size of $C_{in}$. The locations marked with "(0)" shown in FIG. 3 are those where the value of the component is 0 (the same in the other figures).

The storage unit 140 of the grouped convolution processing definition changing device 100 stores the learned CNN models whose definitions have been changed by the definition changing unit 120 in the post-change CNN model storage unit 300, including the weight $W_1$ generated by the weight changing unit 130.

Therefore, in the convolution computation shown in FIG. 3, the AI chip 400 executes the computation to multiply the weight $W_1$ and the input X only once. By executing the computation only once, the AI chip 400 obtains the output Y.

In the convolution computation shown in FIG. 3, the AI chip 400 is affected by the overhead a minimum number of times (one time). However, the AI chip 400 also executes computations on many weight components that have a value of 0. In other words, the convolution computation shown in FIG. 3 is likely not a computation that balances the impact of overhead and the load of matrix computations.

FIG. 4 is an explanatory diagram showing another example of the computation of grouped convolution whose definition has been changed by the grouped convolution processing definition changing device 100.

In the computation of grouped convolution shown in FIG. 4, the definition changing unit 120 changes the number of groups defined in the learned CNN model stored in the pre-change CNN model storage unit 200 from "4" to "2". In accordance with the change in the number of groups, the weight changing unit 130 prepares weights $W_2$ to $W_3$.

The definition changing unit 120 of this example embodiment changes the number of groups defined in the learned CNN model to the number of groups' divisors. In the example shown in FIG. 4, "2" is the divisor of "4".

As shown in FIG. 4, the weight changing unit 130 places the weights $W_a$ to $W_b$ shown in FIG. 1 from the upper left to the lower right of the weight $W_2$, in the order of the weights $W_a$ to $W_b$ on the diagonal line. Next, the weight changing unit 130 generates the weight $W_2$ by setting the values of all components except for the components at the locations where the weights $W_a$ to $W_b$ are placed to 0.

The weight changing unit 130 places the weights $W_c$ to $W_d$ shown in FIG. 1 from the upper left to the lower right of the weight $W_3$, in the order of the weights $W_c$ to $W_d$ on the diagonal line. Next, the weight changing unit 130 generates the weight $W_3$ by setting the values of all components except for the components at the locations where the weights $W_c$ to $W_d$ are placed to 0.

As shown in FIG. 4, weights $W_2$ to $W_3$ are weights of size $(C_{out}/2)$ for vertical and $(C_{in}/2)$ for horizontal. Note that the weight changing unit 130 may divide the weight $W_1$ of size $(C_{in} \times C_{out})$ shown in FIG. 3 into four weights of size $(C_{in}/2) \times (C_{out}/2)$, and generate weights containing non-zero components among the four divided weights as weights $W_2$ to $W_3$.

The storage unit 140 of the grouped convolution processing definition changing device 100 stores the learned CNN models whose definitions have been changed by the definition changing unit 120 in the post-change CNN model storage unit 300, including the weights $W_2$ to $W_3$ generated by the weight changing unit 130.

Thus, in the convolution computation shown in FIG. 4, the AI chip 400 multiplies, for example, the weight $W_2$ and the image consisting of the first to $C_{in}/2$ channels divided (with the number of channels $(C_{in}/2)$). As a result of the multiplication, the AI chip 400 obtains an image with the number of channels $(C_{out}/2)$ as its output.

The AI chip 400 executes the above computation for the weight $W_3$ as well. In other words, the AI chip 400 divides the input X into two pieces in the channel direction, and executes the convolution computation for the image consisting of the $\{(j-1) \times C_{in}/2+1\}$ to the $(j \times C_{in}/2)$ channels (j=1 to 2) divided using the new j-th weight matrix over j=1 to j=2, respectively. The new first weight matrix to the new second weight matrix corresponds to the weights $W_2$ to $W_3$, respectively.

As a result of each computation, the AI chip 400 obtains two images with the number of channels $(C_{out}/2)$. The AI chip 400 then places the obtained images in the same positions as the bi-divided input X used in the computation.

After placing each of the two obtained images, the AI chip 400 combines each image. By combining, the AI chip 400 obtains the output Y.

In other words, the weight changing unit 130 places the weights $W_a$ and $W_b$ from the upper left to the lower right of the weight $W_2$ corresponding to the new first weight matrix, in the order of the weights $W_a$ to $W_b$ on the diagonal line. Next, the weight changing unit 130 generates the weight $W_2$ by setting the values of all components except for the components at the locations where the weights are placed to 0.

In the grouped convolution shown in FIG. 1, the weight $W_a$ corresponds to the first $(=\{(1-1) \times 4/2+1\})$ weight matrix. The weight $W_b$ corresponds to the second $(=(1 \times 4/2))$ weight matrix.

The weight changing unit 130 places the weights $W_c$ and $W_d$ from the upper left to the lower right of the weight $W_3$ corresponding to the new second weight matrix in the order of the weights $W_c$ to $W_d$ on the diagonal line. Next, the weight changing unit 130 generates the weight $W_3$ by setting the values of all components except for the components at the locations where the weights are placed to 0.

In the grouped convolution shown in FIG. 1, the weight $W_c$ corresponds to the third $(=\{(2-1) \times 4/2+1\})$ weight matrix. The weight $W_d$ corresponds to the fourth $(=(2 \times 4/2))$ weight matrix.

In the computation of grouped convolution shown in FIG. 4, the number of times the AI chip 400 is affected by the overhead is reduced from four times in the computation of grouped convolution shown in FIG. 1 to two times.

In addition, in the computation of grouped convolution shown in FIG. 4, compared to the convolution computation shown in FIG. 3, the number of times the AI chip 400 executes computations for components with weights that have a value of 0 reduces. In other words, the computation of grouped convolution shown in FIG. 4 is likely to be a well-balanced computation between the impact of overhead and the load of matrix computations.

As described above, the grouped convolution processing definition changing device 100 of this example embodiment handles a learned convolutional neural network in which grouped convolution is defined in which input data consisting of first to N-th channels (N is an integer greater than or equal to 2) arranged in order is divided into G (G is an integer greater than or equal to 2) pieces in the channel direction. In the grouped convolution, the convolution computations are executed for the data consisting of the $\{(i-1) \times N/G+1\}$ to $(i \times N/G)$ channels (i=1 to G) divided using the i-th weight matrix over i=1 to i=G, respectively.

The definition changing unit 120 changes the number which the input data is divided from G to g (where g is a divisor of G excluding G). When the number is changed from G to g, the weight changing unit 130 generates the new j-th weight matrix to be used in the convolution computation of the data consisting of {(j−1)×N/g+1} to j×N/g) channels (j=1 to g) divided after the divided number is changed over j=1 to j=g, respectively.

Specifically, the weight changing unit 130 generates a new j-th weight matrix by placing the {(j−1)×G/g+1} to (j×G/g) weight matrices from the upper left to the lower right of the new j-th weight matrix in the order of the {(j−1)×G/g+1} to (j×G/g) weight matrices on the diagonal line, and setting the values of all the components except for the components at the locations where the weight matrices are placed to 0.

The optimal value of g depends on the AI chip 400. Therefore, it is preferable that the grouped convolution processing definition changing device 100 generates new weight matrices for all the divisors of G except G, the performance of each AI chip 400 when each weight matrix is used is measured, and the optimal value of g is determined based on the results of each measurement.

The definition changing unit 120 may also change the divided number of the input data from G to 1. The definition changing unit 120 may also change the optimal value of g for each of the multiple convolutional layers that compose the CNN.

[Description of Operation]

Figure 5:
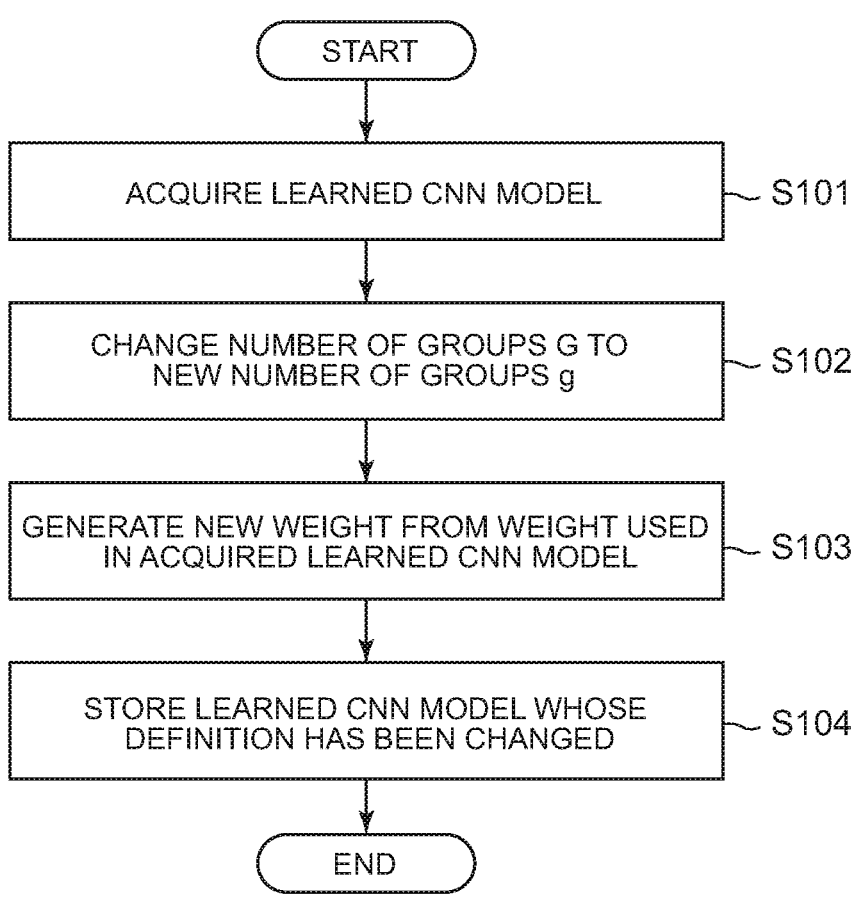
FIG. 5 is a flowchart showing the operation of the grouped convolution processing definition changing processing by the grouped convolution processing definition changing device 100 of this example embodiment.

An operation on the grouped convolution processing definition changing device 100 of this exemplary embodiment is described below with reference to FIG. 5. FIG. 5 is a flowchart showing the operation of the grouped convolution processing definition changing processing by the grouped convolution processing definition changing device 100 of this example embodiment.

First, the acquisition unit 110 of the grouped convolution processing definition changing device 100 acquires the learned CNN model from the pre-change CNN model storage unit 200 (step S101).

Next, the definition changing unit 120 changes the number of groups G defined in the acquired learned CNN model to a new number of groups g (step S102). Note that g is the divisor of G excluding G.

Next, the weight changing unit 130 generates new weights from the weights used in the acquired learned CNN model based on the changed g (step S103).

The method of generating weights by the weight changing unit 130 is as described above. For example, if the number of groups G is changed to the number of groups g, the weight changing unit 130 generates g weights in total. The vertical and horizontal sizes of the weights generated by the weight changing unit 130 are G/g times the vertical and horizontal sizes of the weights acquired.

Next, the storage unit 140 stores the learned CNN model whose definition has been changed by the definition changing unit 120 in the post-change CNN model storage unit 300, including the weights generated by the weight changing unit 130 (step S104). After storing, the grouped convolution processing definition changing device 100 terminates the grouped convolution processing definition changing processing.

[Description of Effect]

The grouped convolution processing definition changing device 100 of this example embodiment has the definition changing unit 120 and the weight changing unit 130 that replace the grouped convolution processing with a processing suitable for the AI chip 400, thereby speeding up the computation of grouped convolution.

Specifically, the grouped convolution processing is replaced by a processing with a high degree of parallelism, which increases the amount of computation but is affected by overhead less often and in which the AI chip 400 excels. Therefore, when the grouped convolution processing definition changing device 100 of this example embodiment is used, the computation of grouped convolution is accelerated despite the increase in the amount of computation.

Figure 6:
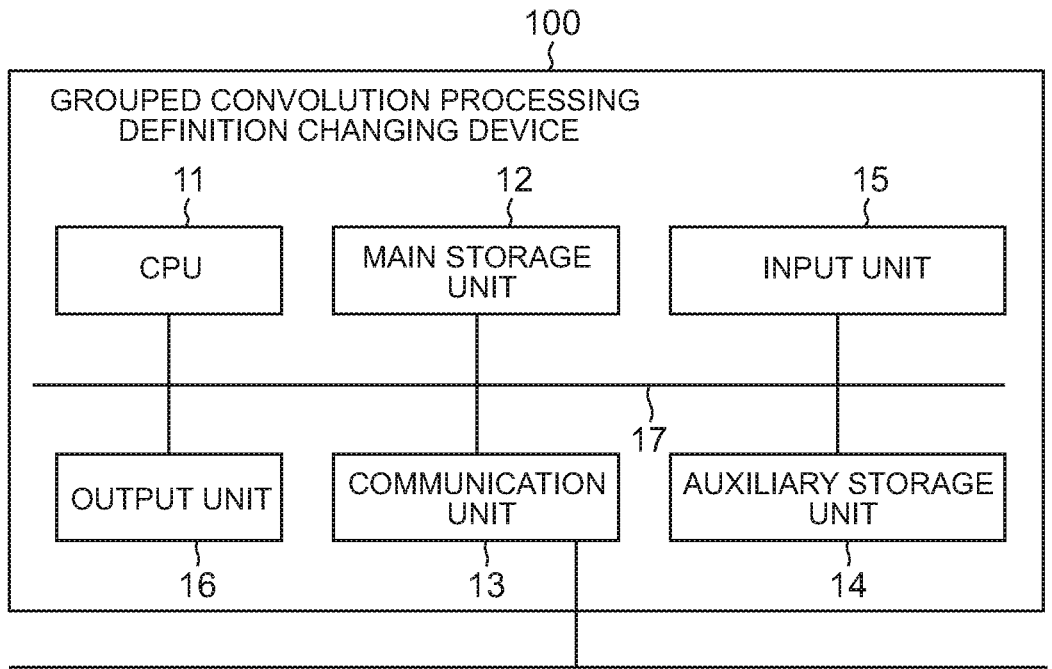
FIG. 6 is an explanatory diagram showing an example of a hardware configuration of the grouped convolution processing definition changing device 100 according to the present invention.

A specific example of a hardware configuration of the grouped convolution processing definition changing device 100 according to this example embodiment will be described below. FIG. 6 is an explanatory diagram showing an example of a hardware configuration of the grouped convolution processing definition changing device 100 according to the present invention.

The grouped convolution processing definition changing device 100 shown in FIG. 6 includes a CPU (Central Processing Unit) 11, a main storage unit 12, a communication unit 13, and an auxiliary storage unit 14. The grouped convolution processing definition changing device 100 also includes an input unit 15 for the user to operate and an output unit 16 for presenting a processing result or a progress of the processing contents to the user.

The grouped convolution processing definition changing device 100 is realized by software, with the CPU 11 shown in FIG. 6 executing a program that provides a function that each component has.

Specifically, each function is realized by software as the CPU 11 loads the program stored in the auxiliary storage unit 14 into the main storage unit 12 and executes it to control the operation of the grouped convolution processing definition changing device 100.

The grouped convolution processing definition changing device 100 shown in FIG. 6 may include a DSP (Digital Signal Processor) instead of the CPU 11. Alternatively, the grouped convolution processing definition changing device 100 shown in FIG. 6 may include both the CPU 11 and the DSP.

The main storage unit 12 is used as a work area for data and a temporary save area for data. The main storage unit 12 is, for example, RAM (Random Access Memory).

The communication unit 13 has a function of inputting and outputting data to and from peripheral devices through a wired network or a wireless network (information communication network).

The auxiliary storage unit 14 is a non-transitory tangible medium. Examples of non-transitory tangible media are, for example, a magnetic disk, an optical magnetic disk, a CD-ROM (Compact Disk Read Only Memory), a DVD-ROM (Digital Versatile Disk Read Only Memory), a semi-conductor memory.

The input unit 15 has a function of inputting data and processing instructions. The input unit 15 is, for example, an input device such as a keyboard or a mouse.

The output unit 16 has a function to output data. The output unit 16 is, for example, a display device such as a liquid crystal display device, or a printing device such as a printer.

As shown in FIG. 6, in the grouped convolution processing definition changing device 100, each component is connected to the system bus 17.

The auxiliary storage unit 14 stores programs for realizing the acquisition unit 110, the definition changing unit 120, the weight changing unit 130, and the storage unit 140 in the grouped convolution processing definition changing device 100 of this example embodiment.

The grouped convolution processing definition changing device 100 may be implemented with a circuit that contains hardware components inside such as an LSI (Large Scale Integration) that realize the functions shown in FIG. 2, for example.

The grouped convolution processing definition changing device 100 may be realized by hardware that does not include computer functions using elements such as a CPU. For example, some or all of the components may be realized by a general-purpose circuit (circuitry) or a dedicated circuit, a processor, or a combination of these. They may be configured by a single chip (for example, the LSI described above) or by multiple chips connected via a bus. Some or all of the components may be realized by a combination of the above-mentioned circuit, etc. and a program.

In the case where some or all of the components are realized by a plurality of information processing devices, circuits, or the like, the plurality of information processing devices, circuits, or the like may be centrally located or distributed. For example, the information processing devices, circuits, etc. may be realized as a client-server system, a cloud computing system, etc., each of which is connected via a communication network.

Figure 7:
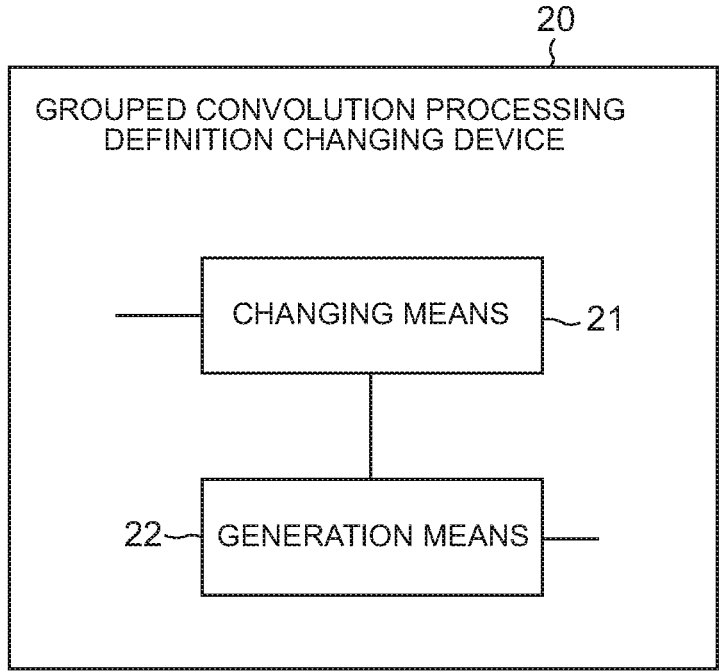
FIG. 7 is a block diagram showing an overview of a grouped convolution processing definition changing device according to the present invention.
Figure 8:
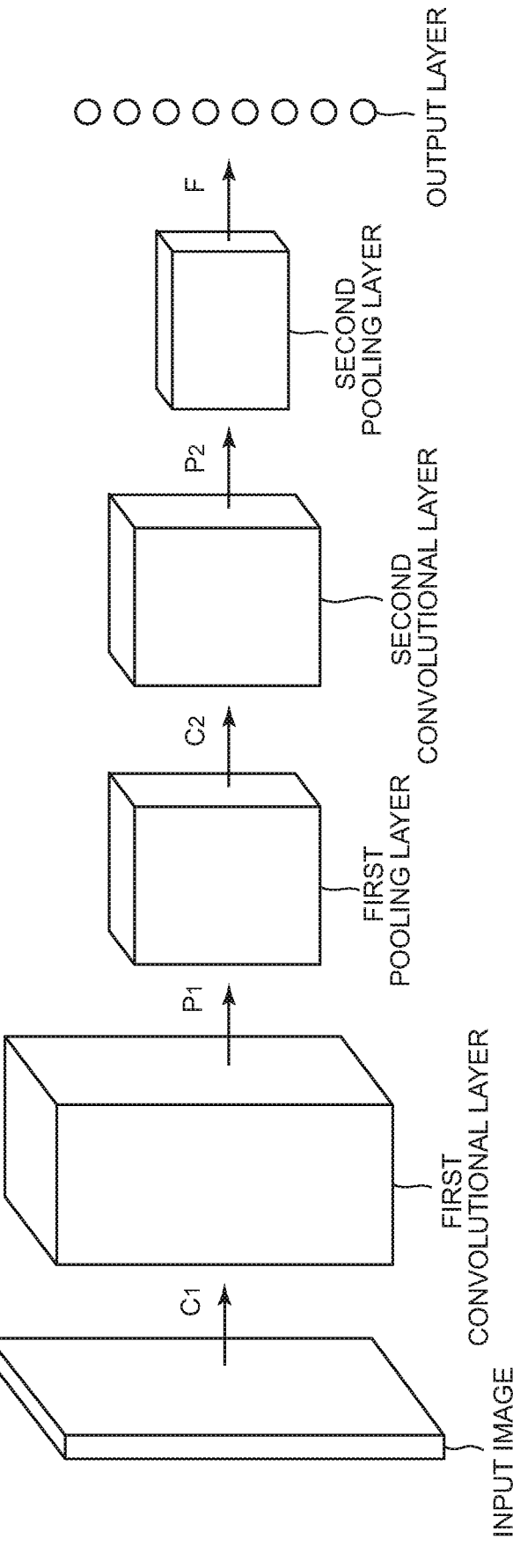
FIG. 8 is an explanatory diagram showing an example of a convolutional neural network.

Next, an overview of the present invention will be described. FIG. 7 is a block diagram showing an overview of a grouped convolution processing definition changing device according to the present invention. The grouped convolution processing definition changing device 20 according to the present invention includes a changing means 21 (for example, the definition changing unit 120) which changes, for a learned convolutional neural network in which grouped convolution is defined in which input data consisting of first to N-th channels (N is an integer greater than or equal to 2) arranged in order is divided into G (G is an integer greater than or equal to 2) pieces in a channel direction, and convolution computations are executed for data consisting of {(i–1)×N/G+1} to (i×N/G) channels (i=1 to G) divided using i-th weight matrix over i=1 to i=G respectively, a number which the input data is divided from G to g (where g is a divisor of G excluding G), and a generation means 22 (for example, the weight changing unit 130) which generates a new j-th weight matrix to be used in the convolution computation of data consisting of {(j–1)× N/g+1} to j×N/g) channels (j=1 to g) divided after the divided number is changed over j=1 to j=g respectively, wherein the generation means 22 generates the new j-th weight matrix by placing {(j–1)×G/g+1} to (j×G/g) weight matrices from the upper left to the lower right of the new j-th weight matrix in the order of {(j–1)×G/g+1} to (j×G/g) weight matrices on the diagonal line, and setting values of all components except for components at locations where the weight matrices are placed to 0.

With such a configuration, the grouped convolution processing definition changing device can increase the computation speed of grouped convolution.

The changing means 21 may change the number which the input data is divided from G to 1.

With such a configuration, the grouped convolution processing definition changing device can minimize the impact of overhead.

The changing means 21 may change the number which the input data is divided for each of multiple convolutional layers that compose the learned convolutional neural network, respectively.

With such a configuration, the grouped convolution processing definition changing device can change the definition of grouped convolution for each convolutional layer.

REFERENCE SIGNS LIST

11 CPU
12 Main storage unit
13 Communication unit
14 Auxiliary storage unit
15 Input unit
16 Output unit
17 System bus
20, 100 Grouped convolution processing definition changing device
21 Changing means
22 Generation means
110 Acquisition unit
120 Definition changing unit
130 Weight changing unit
140 Storage unit
200 Pre-change CNN model storage unit
300 Post-change CNN model storage unit
400 AI chip

What is claimed is:

1. A grouped convolution processing definition changing device for increasing computation speed of grouped convolution, the grouped convolution processing definition changing device comprising:
   a memory configured to store instructions; and
   a processor configured to execute the instructions to:
      change, for a learned convolutional neural network in which grouped convolution is defined in which input data consisting of first to N-th channels (N is an integer greater than or equal to 2) arranged in order is divided into G (G is an integer greater than or equal to 2) pieces in a channel direction so that divided data consisting of {(i–1)×N/G+1} to (i×N/ G) channels (i=1 to G) are obtained, and in which convolution computations are executed for the divided data consisting of {(i–1)×N/G+1} to (i×N/ G) channels (i=1 to G) using i-th weight matrix over i=1 to i=G respectively,
      a number of divisions of the input data from G to g (where g is a divisor of G excluding G); and
      generate a new j-th weight matrix to be used in the convolution computation of data consisting of {(j– 1)×N/g+1} to (j×N/g) channels (j=1 to g) divided after the number of divisions of the input data is changed over j=1 to j=g respectively,
      wherein the processor generates the new j-th weight matrix by placing {(j–1)×G/g+1} to (j×G/g) weight matrices from the upper left to the lower right of the new j-th weight matrix in the order of {(j–1)×G/g+1} to (j×G/g) weight matrices on the diagonal line, and setting values of all components except for components at locations where the weight matrices are placed to 0.

2. The grouped convolution processing definition changing device according to claim 1,
   wherein the processor changes the number of divisions of the input data from G to 1.

3. The grouped convolution processing definition changing device according to claim 1,
   wherein the processor changes the number of divisions of the input data for each of multiple convolutional layers that compose the learned convolutional neural network, respectively.

4. A grouped convolution processing definition changing method for increasing computation speed of grouped convolution, the grouped convolution processing definition changing method comprising:

changing, for a learned convolutional neural network in which grouped convolution is defined in which input data consisting of first to N-th channels (N is an integer greater than or equal to 2) arranged in order is divided into G (G is an integer greater than or equal to 2) pieces in a channel direction so that divided data consisting of $\{(i-1)\times N/G+1\}$ to $(i\times N/G)$ channels (i=1 to G) are obtained, and in which convolution computations are executed for the divided data consisting of $\{(i-1)\times N/G+1\}$ to $(i\times N/G)$ channels (i=1 to G) using i-th weight matrix over i=1 to i=G respectively, a number of divisions of the input data from G to g (where g is a divisor of G excluding G);

generating a new j-th weight matrix to be used in the convolution computation of data consisting of $\{(j-1)\times N/g+1\}$ to $(j\times N/g)$ channels (j=1 to g) divided after the number of divisions of the input data is changed over j=1 to j=g respectively; and generating the new j-th weight matrix by placing $\{(j-1)\times G/g+1\}$ to $(j\times G/g)$ weight matrices from the upper left to the lower right of the new j-th weight matrix in the order of $\{(j-1)\times G/g+1\}$ to $(j\times G/g)$ weight matrices on the diagonal line, and setting values of all components except for components at locations where the weight matrices are placed to 0.

5. The grouped convolution processing definition changing method according to claim 4, further comprising:

changing the number of divisions of the input data from G to 1.

6. The grouped convolution processing definition changing method according to claim 4, further comprising:

changing the number of divisions of the input data for each of multiple convolutional layers that compose the learned convolutional neural network, respectively.

7. A non-transitory computer-readable recording medium recording a grouped convolution processing definition changing program for increasing computation speed of grouped convolution, the grouped convolution processing definition changing program causing a computer to execute:

a changing process of changing, for a learned convolutional neural network in which grouped convolution is defined in which input data consisting of first to N-th channels (N is an integer greater than or equal to 2) arranged in order is divided into G (G is an integer greater than or equal to 2) pieces in a channel direction so that divided data consisting of $\{(i-1)\times N/G+1\}$ to $(i\times N/G)$ channels (i=1 to G) are obtained, and in which convolution computations are executed for the divided data consisting of $\{(i-1)\times N/G+1\}$ to $(i\times N/G)$ channels (i=1 to G) using i-th weight matrix over i=1 to i=G respectively, a number of division of the input data from G to g (where g is a divisor of G excluding G); and a generation process of generating a new j-th weight matrix to be used in the convolution computation of data consisting of $\{(j-1)\times N/g+1\}$ to $(j\times N/g)$ channels (j=1 to g) divided after the number of divisions of the input data is changed over j=1 to j=g respectively, wherein the grouped convolution processing definition changing program causes the computer to generate the new j-th weight matrix by placing $\{(j-1)\times G/g+1\}$ to $(j\times G/g)$ weight matrices from the upper left to the lower right of the new j-th weight matrix in the order of $\{(j-1)\times G/g+1\}$ to $(j\times G/g)$ weight matrices on the diagonal line, and setting values of all components except for components at locations where the weight matrices are placed to 0, in the generation process.

8. The recording medium according to claim 7, causing the computer to execute:

wherein the grouped convolution processing definition changing program causes the computer to change the number of divisions of the input data from G to 1, in the changing process.

9. The recording medium according to claim 7, causing the computer to execute:

wherein the grouped convolution processing definition changing program causes the computer to change the number of divisions of the input data for each of multiple convolutional layers that compose the learned convolutional neural network, respectively, in the changing process.

* * * * *